(12) United States Patent  (10) Patent No.: US 7,594,576 B2
Chen et al.  (45) Date of Patent: Sep. 29, 2009

(54) PDA CARRYING DEVICE

(75) Inventors: Yun-Lung Chen, Tu-Cheng (TW); Xian-Huang Gao, Shenzhen (CN); Wen-Yu Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 563 days.

(21) Appl. No.: 11/145,803

(22) Filed: Jun. 6, 2005

(65) Prior Publication Data
US 2006/0104021 A1 May 18, 2006

(30) Foreign Application Priority Data
Nov. 12, 2004 (CN) .................... 2004 2 0095302 U

(51) Int. Cl.
B65D 85/00 (2006.01)
B65D 85/38 (2006.01)
(52) U.S. Cl. ...................... 206/320; 206/305
(58) Field of Classification Search ................. 206/320, 206/305, 45.23, 722, 328, 216, 591, 334; 361/681, 682, 683, 680, 679; 150/165; 455/550.1; 218/309.1; D3/218
See application file for complete search history.

(56) References Cited

U.S. PATENT DOCUMENTS

| 5,002,184 | A | * | 3/1991 | Lloyd | 206/305 |
| 5,368,159 | A | * | 11/1994 | Doria | 206/320 |
| 5,388,692 | A | * | 2/1995 | Withrow et al. | 206/320 |
| 5,931,434 | A | * | 8/1999 | Rodriguez | 248/345.1 |
| 6,068,119 | A | * | 5/2000 | Derr et al. | 206/305 |
| 6,616,111 | B1 | * | 9/2003 | White | 248/309.1 |
| 6,626,362 | B1 | * | 9/2003 | Steiner et al. | 235/462.45 |
| 6,758,335 | B2 | * | 7/2004 | Kajiya | 206/320 |
| 6,772,879 | B1 | * | 8/2004 | Domotor | 206/45.23 |
| 6,892,880 | B2 | * | 5/2005 | Nieves | 206/320 |
| 6,995,976 | B2 | * | 2/2006 | Richardson | 361/681 |
| 2001/0040109 | A1 | * | 11/2001 | Yaski et al. | 206/320 |

FOREIGN PATENT DOCUMENTS

CN 01219757.2 2/2002

* cited by examiner

Primary Examiner—Bryon P Gehman
Assistant Examiner—Ernesto A Grano
(74) Attorney, Agent, or Firm—D. Austin Bonderer

(57) ABSTRACT

A PDA carrying device includes a base body (20), a front panel (10) and rear cover (30). The base body is used to hold a PDA. The front panel is pivotably attached to the base body. The rear cover is mounted on the base body. The base body has a plurality of hermetic flanges engaging with the front panel and the rear cover respectively.

14 Claims, 4 Drawing Sheets

PDA CARRYING DEVICE

BACKGROUND OF THE INVENTION

1. Field of the Invention

The present invention relates to carrying devices of electronic devices, and particularly to a person digital assistant (PDA) carrying device.

2. Background of the Invention

Many users of PDA devices desire carrying cases to carry, cover and protect heir PDAs. Conventional PDA carrying case is made of flexible leather. The flexible leather only protects the PDA from being scrapped, but not from being hit.

An improvement in the carrying case of the PDA is illustrated and described in China Patent No. 01219757.2. In this patent, a rigid PDA case is disclosed. The PDA case includes a main body and a cover. A suitable space is formed within the main body for receiving a PDA. An opening is defined in a front portion of the main body. A pair of guiding slots is defined in both sides of inside surface of the main body. The cover is pivotally attached to the main body and covers the opening of the front portion. The PDA slides into the main body along the guiding slots, and is thus mounted in the main body. When using the PDA, the cover is opened. However, the PDA case described above obviously does not have a high dustproof and waterproof capability.

What is needed, therefore, is a PDA carrying device having an high airproof capability.

SUMMARY

A PDA carrying device in accordance with a preferred embodiment of the invention includes a base body, a front panel and rear cover. The base body is used to hold a PDA. The front panel is pivotably attached to the base body. The rear cover is mounted on the base body. The base body has a plurality of hermetic flanges engaging with the front panel and the rear cover respectively.

Other advantages and novel features of the present invention will be drawn from the following detailed description of preferred embodiment with attached drawings, in which:

DETAIL DESCRIPTION OF PREFERRED EMBODIMENT

Figure 1:
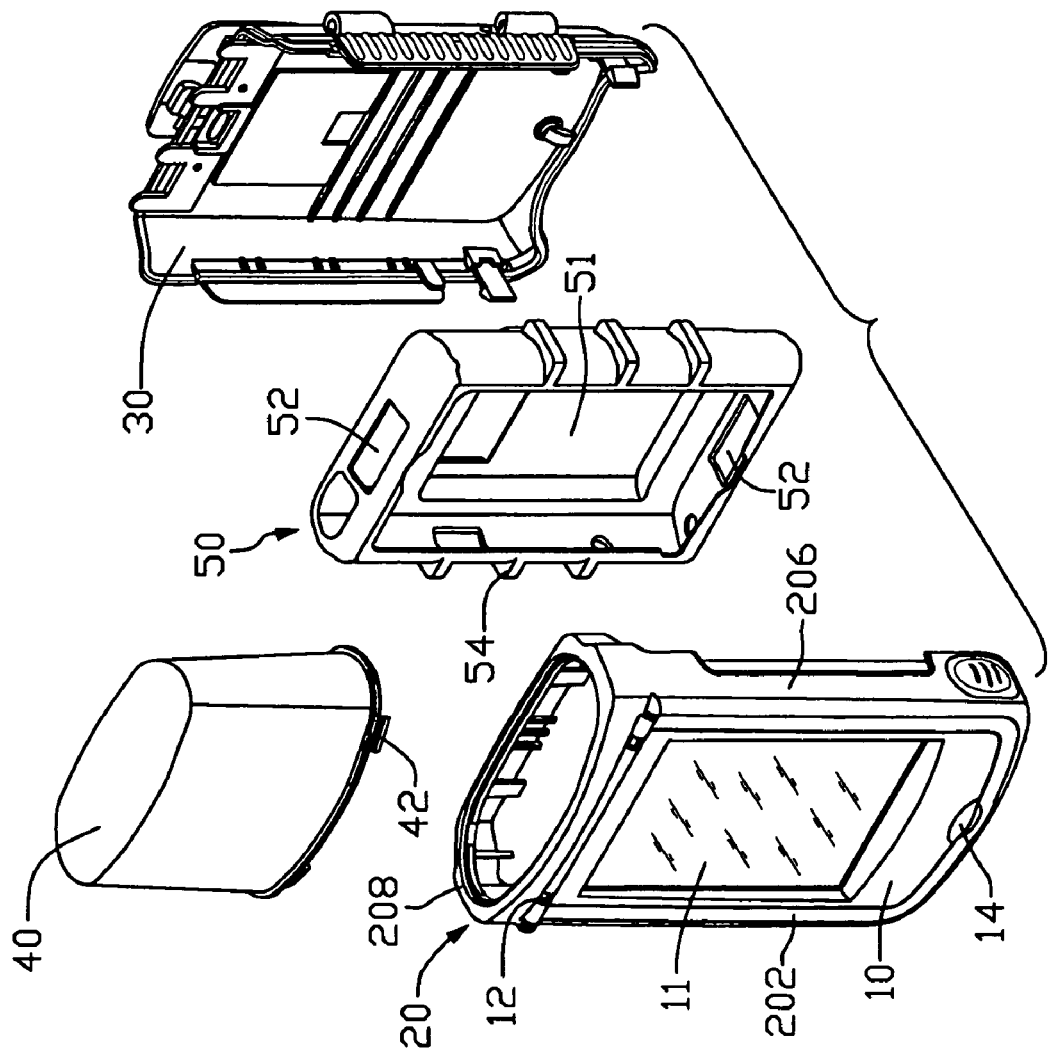
FIG. 1 is an exploded, isometric view of a person digital assistant (PDA) carrying device of a preferred embodiment of the present invention, including a base body, a rear cover, an expansion cover and a shock absorbing case.
Figure 2:
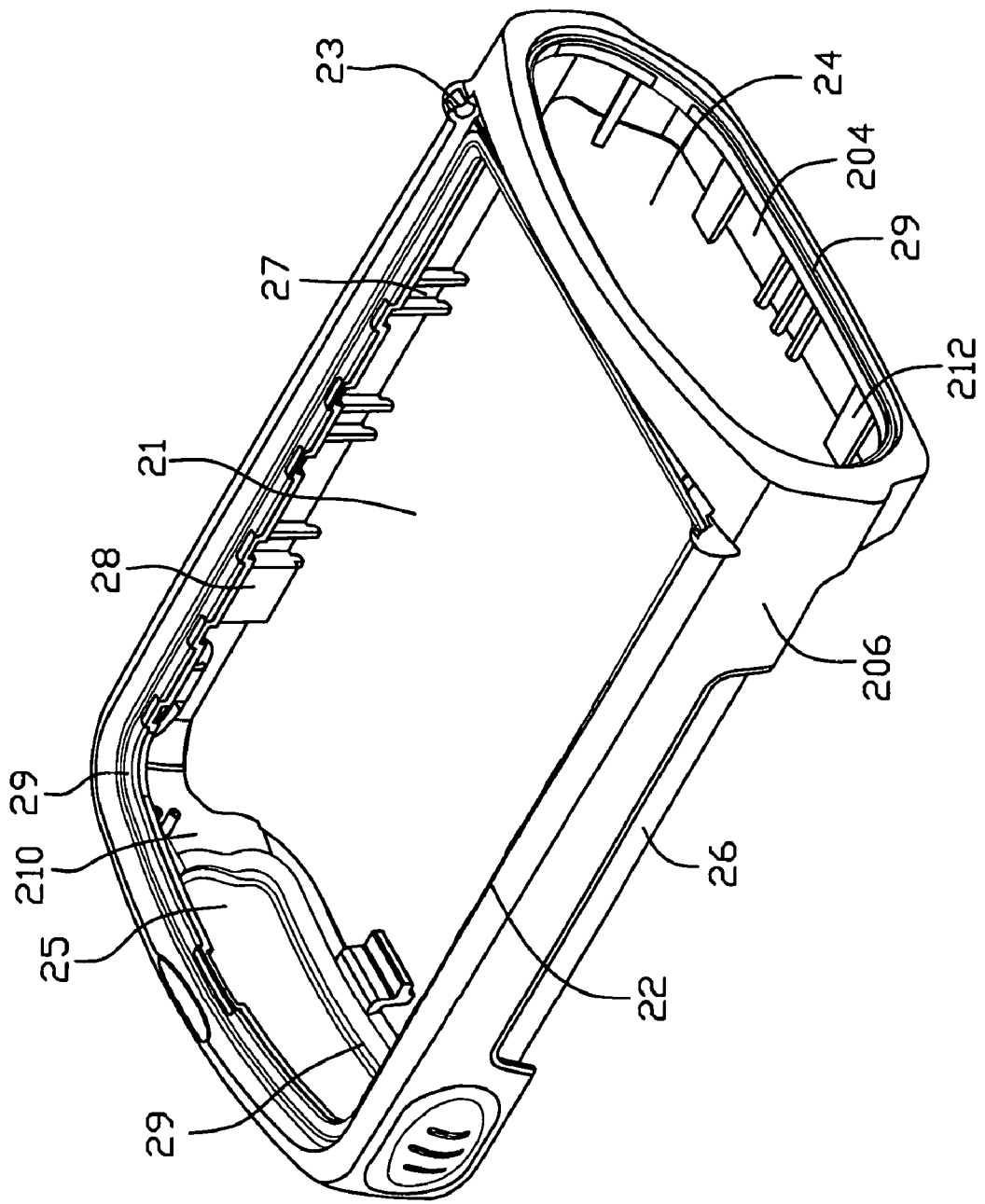
FIG. 2 is another aspect view of the base body of FIG. 1.

Referring to FIGS. 1 and 2, a carrying device of a portable electronic device like a person digital assistant (PDA) includes a base body 20, a front panel 10, a rear cover 30, an expansion cover 40 and a shock absorbing case 50. The front panel 10, the rear cover 30 and the expansion cover 40 are treated as attachments of the base body 20.

The base body 20 is hollow for holding a PDA (not shown) therein and includes a front plate 202, a rear plate 204, a pair of side walls 206, a top wall 208 and a bottom wall 210. An opening 22 is defined in a front plate 202 of the base body 20. A pair of shaft holding portions 23 is formed at a top edge of the opening 22. The front panel 10 is pivotably attached to the shaft holding portion 23 having a shaft 12 disposed at a top edge. The front panel 10 has a transparent window 11 in a top portion. An operating portion 14 protrudes from a lower edge of the front panel 10. A concave is defined at a lower edge of the opening 22 of the base body 20 corresponding to the operating portion 14. The rear plate 204 defines an opening 21 therein. A plurality of guide projecting tabs 212 extends from a top edge of the opening 21. A plurality of locking grooves 27 is formed at inside surface of the side walls 206 and each includes a pair of positioning tabs. A pair of sockets 28 is formed at inside surfaces of the side walls 206 of the base body 20. The top wall 208 defines an opening 24 therein for receiving the expansion cover 40. A pair of positioning grooves 26 is defined in the side walls 206 of the base body 20. The bottom wall 210 defines an opening 25 therein. A plurality of continuate hermetic flanges 29 is formed at edges of openings 22, 24 and 25.

Figure 3:
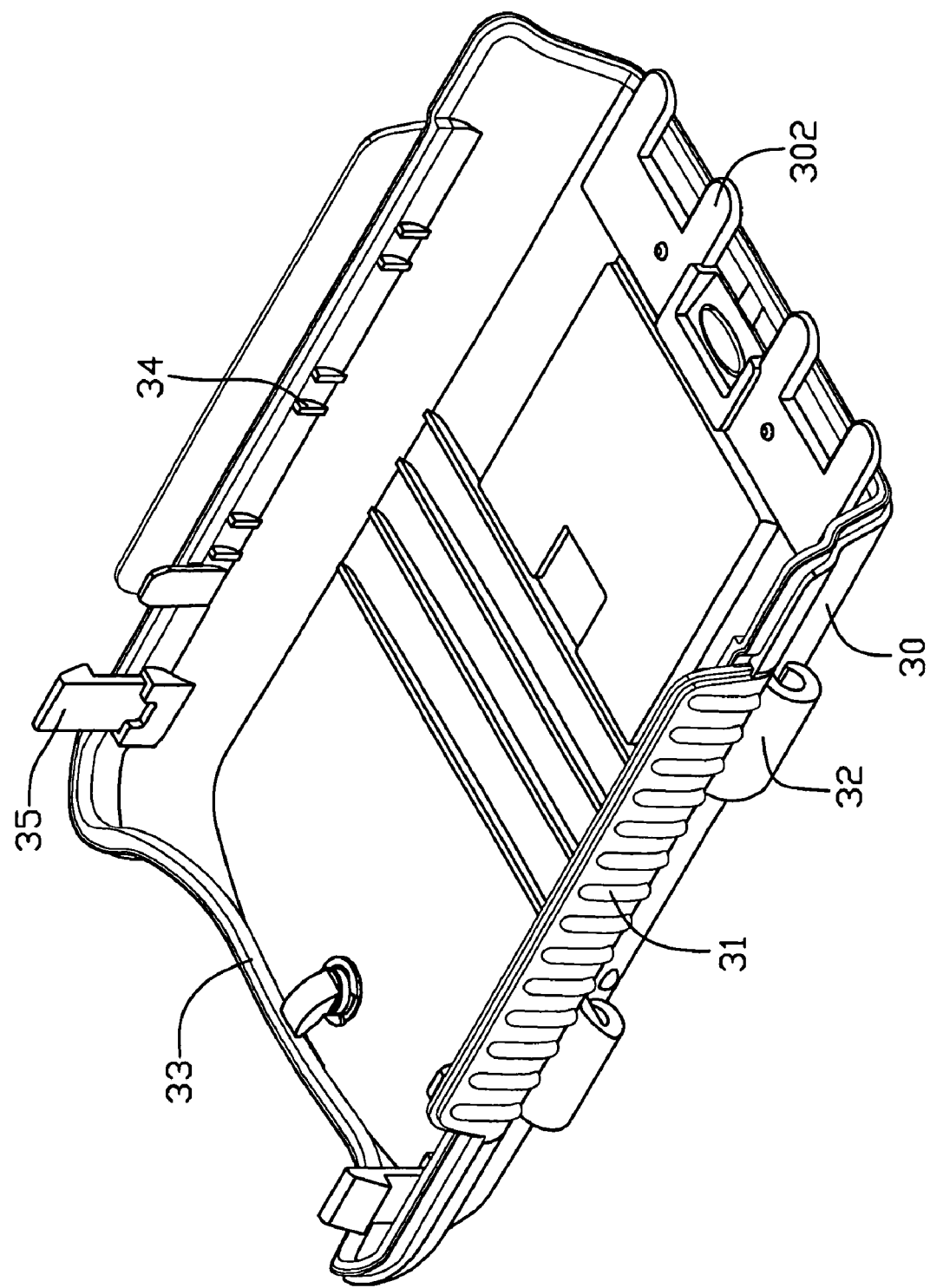
FIG. 3 is another aspect view of the shock absorbing case of FIG. 1.

Referring to FIG. 3, the rear cover 30 is used to cover the opening 21 of the base body 20. A plurality of locking grooves 34, corresponding to locking groove 27 of base body 20, is formed at an inner surface of both sides of rear cover 30 and includes a pair of tabs protruding therefrom. A plurality of projecting tabs 302 extends from a top edge corresponding to the guide projecting tabs 212 of the base body 20. A pair of hooks 35 projects from the side edges of rear cover corresponding to the sockets 28 of the base body 20. A pair of extending portions 31 protrudes from side edges of rear cover 30 corresponding to the positioning grooves 26 of the base body 20. A continuate hermetic flange 33 is formed at edges of the rear cover 30.

The expansion cover 40 is hollow and used to holding expansion cards (not shown). A plurality of locking portions 42 extends downward from bottom of the expansion cover 40.

The shock absorbing case 50 is hollow. An opening 51 is defined in a front panel. A plurality of input/output (I/O) holes 52 is defined in a top wall and a bottom wall of the shock absorbing case. A plurality of positioning portions 54 projects from outside surface of side walls of shock absorbing case 50.

Figure 4:
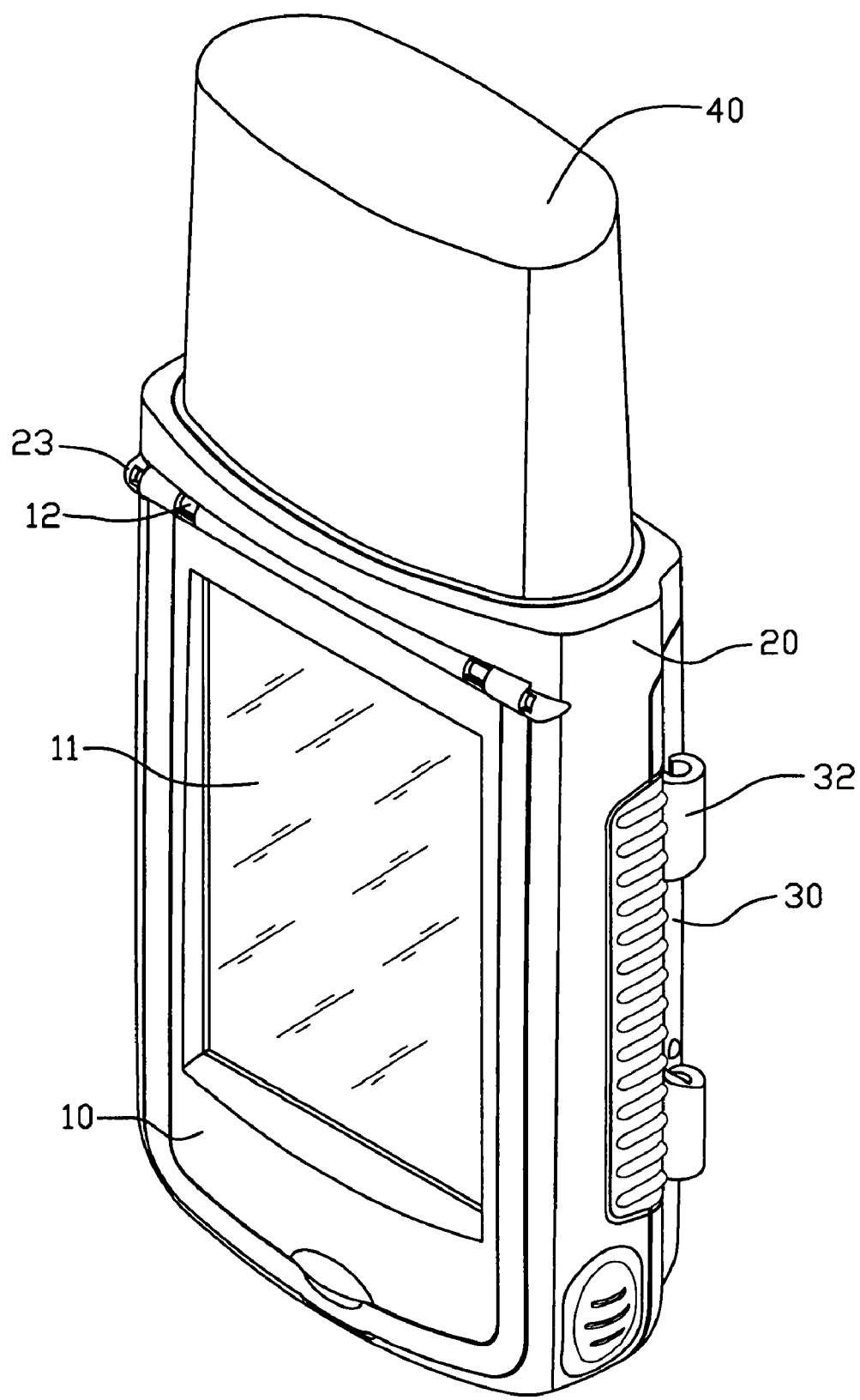
FIG. 4 is an assembly view of FIG. 1.

Referring also to FIG. 4, in assembly, the PDA is secured into the shock absorbing case 50 via the opening 51. Then the shock absorbing case 50 with the PDA is mounted into the base body 20. The positioning portions 54 of the shock absorbing case 50 slide into the locking grooves 27 of the base body 20. The projecting tabs 302 of the rear cover 30 insert into the base body 20 along the guide projecting tabs 212. The hooks 35 of the rear cover 30 insert into the sockets 28 of the base body 20. The rear cover 30 is thus mounted on the base body 20. At this time, the positioning slots 34 of the rear cover 30 also grasp the positioning portions 54 of the shock absorbing case 50. The locking portions 42 of the expansion cover 40 insert into the opening 24 of the base body 20 and are hooked by edges of the opening 24. The expansion cover 40 is thus mounted on the base body 20.

In use, the front panel 10 is rotated outward by pushing the operating portion 14. In the PDA carrying device, the hermetic flanges 29, 33 are made of resilient material, such as soft plastic. The hermetic flanges 29, 33 are used to improve airproof, dustproof and waterproof capabilities of the PDA carrying device.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A PDA carrying device comprising:
   a base body for holding a PDA;
   a rear cover mounted on the base body; and
   a shock absorbing case for improving a shockproof capability of the PDA;
   wherein the base body has a plurality of hermetic flanges engaging with the rear cover;
   wherein a plurality of positioning portions protrude from the shock absorbing case, and the base body has a plurality of locking grooves defined by spaced-apart positioning tabs protruding from the base body and for securing the positioning portions of the shock absorbing case.

2. The PDA carrying device as described in claim 1, further comprising a front panel pivotably attached to the base body, and a plurality of hermetic flanges formed in said base body for engaging with the front panel.

3. The PDA carrying device as described in claim 2, further comprising an expansion cover for holding expansion cards.

4. The PDA carrying device as described in claim 3, wherein an opening is defined in a top wall of the base body, and the expansion cover is locked by the edges of the opening.

5. The PDA carrying device as described in claim 1, further comprising an expansion cover mounted on the base body, and a plurality of hermetic flanges formed in the base body for engaging with the expansion cover.

6. The PDA carrying device as described in claim 1, wherein the hermetic flange is made of soft plastic.

7. A PDA carrying device comprising:
   a base body for holding a PDA, comprising a front plate and a top plate, the top plate perpendicular to the front plate and defining an opening therein;
   a shock absorbing case for improving shockproof capability of the PDA;
   a front panel pivotably attached to the front plate of the base body; and
   an expansion cover mounted to the base body along the opening;
   wherein the base body has a plurality of compressible flanges engaging with the front panel and the expansion cover respectively.

8. The PDA carrying device as described in claim 7, wherein a plurality of positioning portion protrudes from the shock absorbing case, and the base body has a plurality of locking grooves for securing the positioning portion.

9. The PDA carrying device as described in claim 8, wherein a plurality of positioning tabs protrude from the base body, and the locking grooves are thus formed between each pair of the positioning tabs.

10. The PDA carrying device as described in claim 7, wherein the compressible flange is made of soft plastic.

11. A crying device of a portable electronic device, comprising:
    a base body for mainly providing space therein to receive the portable electronic device, the base body comprising at least one opening;
    a shock absorbing case received within said base body to separate the portable electronic device from said base body and avoid direct contact with said base body;
    at least one separable attachment attached to said base body by covering said at least one opening, said at least one attachment comprising a front panel pivotably attached to a front plate of said base body, a rear cover mounted on a backside of said base body and an expansion cover attached to said base body between said front panel and said rear cover; and
    a plurality of compressible flanges formed at said base body along edges of said at least one opening so as to allow said at least one attachment to hermetically engage with said base body via said flange.

12. The carrying device as described in claim 11, wherein said flanges are made of soft plastic.

13. The carrying device as described in claim 11, wherein said expansion cover is attached to said base body along a direction parallel to said front plate of said base body.

14. The carrying device as described in claim 11, wherein a plurality of positioning portions protrude from said shack absorbing case, and said base body comprising a plurality of locking grooves for correspondingly securing said plurality of positioning portions therein.

* * * * *

UNITED STATES PATENT AND TRADEMARK OFFICE
CERTIFICATE OF CORRECTION

PATENT NO. : 7,594,576 B2 Page 1 of 1
APPLICATION NO. : 11/145803
DATED : September 29, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Twenty-eighth Day of September, 2010

David J. Kappos
*Director of the United States Patent and Trademark Office*